United States Patent [19]
Chang

[11] Patent Number: 5,669,716
[45] Date of Patent: Sep. 23, 1997

[54] LINEAR BALL BEARING

[75] Inventor: Chao Song Chang, Taichung, Taiwan

[73] Assignee: Hiwin Technologies Corporation, Taichung, Taiwan

[21] Appl. No.: 583,886

[22] Filed: Jan. 11, 1996

Related U.S. Application Data

[63] Continuation-in-part of Ser. No. 403,997, Mar. 14, 1995, abandoned.

[51] Int. Cl.⁶ .................................................. F16C 29/06
[52] U.S. Cl. ......................................... 384/43; 384/16
[58] Field of Search ..................................... 384/43, 16

[56] References Cited

U.S. PATENT DOCUMENTS

| | | |
|---|---|---|
| 3,565,494 | 2/1971 | Linz et al. ........................... 384/43 |
| 3,973,809 | 8/1976 | Breteler et al. ..................... 384/43 |
| 4,108,503 | 8/1978 | Ernst et al. ......................... 384/43 |
| 4,139,242 | 2/1979 | Ernst et al. ......................... 384/43 |
| 4,206,951 | 6/1980 | Ernst et al. ......................... 384/43 |
| 4,357,056 | 11/1982 | Olschewski et al. .............. 384/43 |
| 4,372,623 | 2/1983 | Koschmieder ..................... 384/43 |
| 4,423,911 | 1/1984 | Olschewski et al. .............. 384/43 |
| 5,046,862 | 9/1991 | Ng ....................................... 384/43 |
| 5,152,614 | 10/1992 | Albert et al. ....................... 384/43 |

*Primary Examiner*—Thomas R. Hannon
*Attorney, Agent, or Firm*—Pro-Techtor International

[57] ABSTRACT

A new ball circulating system for a linear ball bearing that greatly simplifies the manufacturing process of the ball bearing. The linear ball bearing includes an outer sleeve, a ball retainer, several ball tracks and two snap rings. Each ball track includes a linear loaded ball groove and a linear unloaded ball groove, and two semi-circular ball turning grooves which allow the steel balls to turn 180 degrees between the two linear ball grooves. The turning grooves include two-stage depth variations to simplify the geometry of the inner surface of the outer sleeve, to provide better manufacturability, and to increase the bearing's overall strength and longevity.

2 Claims, 7 Drawing Sheets

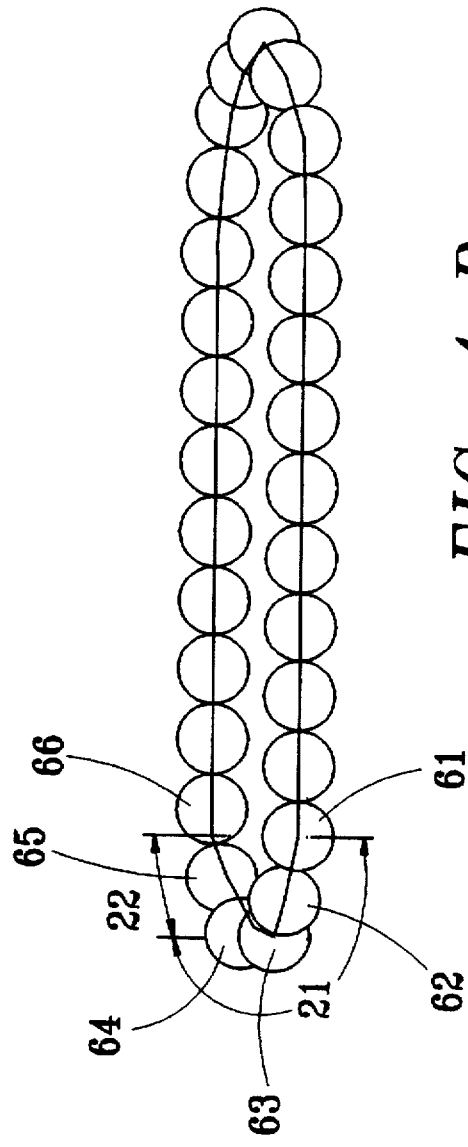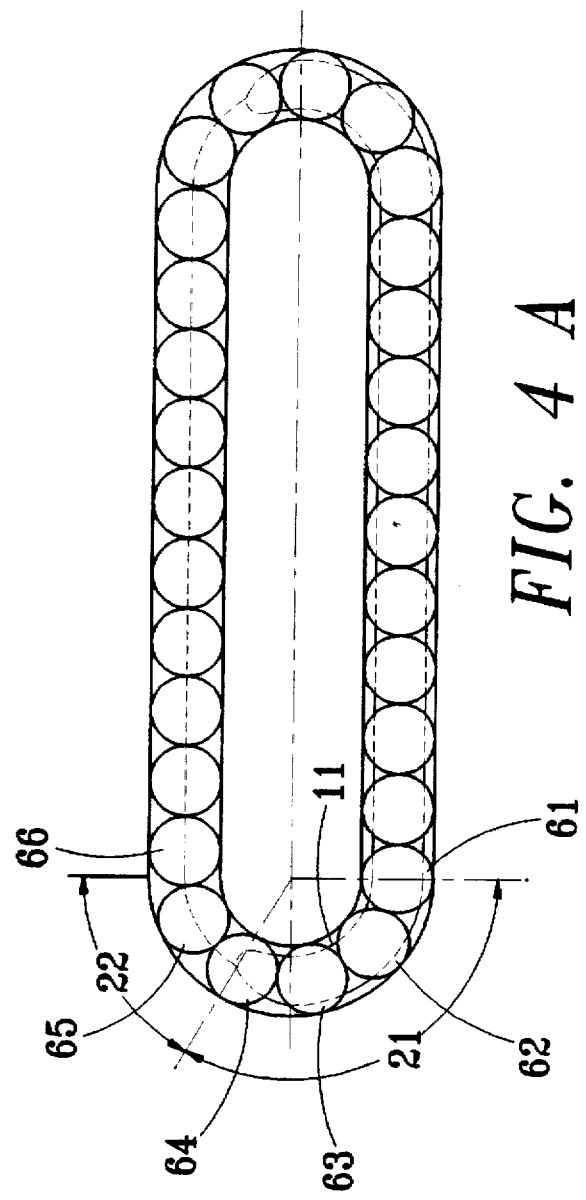
FIG. 4 B
FIG. 4 A

LINEAR BALL BEARING

This application is a continuation-in-part of my co-pending application Ser. No. 08/403,997 filed Mar. 14, 1995, now abandoned.

BACKGROUND OF INVENTION

1. Field of the Invention

The present invention relates to a linear ball bearing designed with several steel ball tracks to sustain external loads. The linear ball bearing can be used as a component to transport loads in a linear direction due to the ball bearing's very low friction when it moves along a linear shaft.

The present invention greatly improves the conventional linear ball bearing's circulation system for steel balls. In particular in order to make the circulation of steel balls smoother, the depth of the ball turning grooves of the ball retainer comprises two different stages. Furthermore, this new design simplifies the inner geometric shape of the outer sleeve. The simplification in the geometry of the outer sleeve improves the manufacturablity and reduces the production cost of the bearing.

2. Description of the Prior the Art.

As shown in FIG. 1, the conventional linear ball bearing's retainer 21 has several tracks for the balls' circulation. Each track contains two straight sections (a linear loaded ball groove 81 and a linear unloaded ball groove 91) and a ball turning groove at each end (not shown in FIG. 1 ).

The ball turning groove gradually ascends to allow steel ball 61 to move from the loaded ball groove 81 through the ball turning groove into the unloaded ball groove 91. In the ball turning groove steel balls will turn 180 degrees. Thus, such a change in the turning groove 5 depth and the balls' orientation restricts the geometric shape of the inner surface of the outer sleeve 1A. Due to the gradual depth change in the turning groove, the inner surface of the outer sleeve 1A needs to be appropriately machined. For the conventional ball bearing design this machining is necessary to avoid the interference between the steel balls and the inner surface of the outer sleeve 1A during the steel balls' turning. Also the large clearance required between the inner surface of the outer sleeve 1A and the ball retainer 21 for this conventional design will be prone to contamination which will decrease the ball bearing's expected service life.

A uniquely shaped complex ball support surface connects each pair of ball turning grooves while maintaining a constant "floor to ceiling height" about the balls to provide the operation of the linear ball bearing. To form the ball turning grooves while maintaining a constant floor to ceiling height about the balls has been accomplished using a complex three curve design, as disclosed by Ng in U.S. Pat. No. 5,046,862. The present design uses only three simple stage variations of the ball retainer, which allows the outer sleeve to be manufactured easily.

SUMMARY OF THE INVENTION

The purpose of the present invention is to provide a new ball circulation system for a linear ball bearing to simplify the manufacturing process of the ball bearing. The linear ball bearing produces very little friction as it moves along the bearing shaft. The linear ball bearing comprises an outer sleeve, a ball retainer, several ball tracks, and two snap rings. Each ball track comprises a linear loaded ball groove, a linear unloaded ball groove, and two semi-circular ball turning grooves which allow the steel balls to turn through 180 degrees between the two linear ball grooves.

The bottom of the loaded ball groove has an opening to allow one side of the steel balls to contact the shaft while the opposite side of the steel balls contacts the inner surface of the outer sleeve. The rolling movement of the steel balls will only generate a small amount of friction. A circular channel forms the tracks to facilitate the movement of the balls. The tracks for the steel balls comprise two semi-circular turning grooves that are connected to loaded and unloaded ball grooves. The loaded and unloaded ball grooves are positioned on different radial positions on the retainer's outer surface. Thus the depth of the semi-circular ball turning groove has to change to allow the steel balls to turn from the loaded ball groove to the unloaded ball groove smoothly. Furthermore, the change of depth of the semi-circular ball turning grooves influences the geometric shape of the inner surface of the outer sleeve.

For the purpose of simplifying the geometry of the inner surface of the outer sleeve to improve manufacturablity, and to increase the ball retainer's strength the present invention designs a new two-stage depth variation for the semi-circular ball turning grooves.

The depth change in the ball turning groove at a first stage allows the steel balls to begin to move from the loaded ball groove to the semi-circular ball turning groove, moving through an arc of approximately 120 degrees. In this stage, the elevation of the floor of the ball turning groove is gradually raised to ½H level, and the steel balls are kept inside the groove. The symbol H represents the difference of the height from the loaded groove's level to the unloaded groove's level. The opening of the loaded ball groove extends to the ball turning groove. A slanted surface of the outer sleeve is simply cut by a lathe machine. In this region the steel ball leaves the shaft surface and easily turns in or turns out between the loaded groove and the turning groove.

At a second stage of the turning groove, the steel balls continue through the remaining arc of about 60 degrees. In this region, the elevation of the floor of the turning groove is gradually raised to the unloaded groove's level. Due to the increasing elevation of the groove at this stage, the steel balls will partially protrude beyond the outer surface of the retainer. Thus, there has to be an indentation on the inner surface of the outer sleeve to accommodate the passage of the steel balls.

The variations of depth in the different stages of the turning groove is designed to improve the unloaded ball groove's strength. Since the unloaded groove's depth is almost equivalent to the ball's radius, there has to be a semi-circular shaped indentation on the inner surface of the outer sleeve that corresponds to the unloaded ball groove to allow the steel balls to move within the groove smoothly. The two stages' depth variation of the semi-circular ball turning groove for the steel ball retainer can maximize the balls' circulation effect by simplifying the inner geometry of the outer sleeve and reducing the potential for jamming.

The present invention uses several evenly distributed square projections on the outer surface of the retainer and indentations on the inner surface of the outer sleeve to prevent the retainer from rotating inside the outer sleeve. Also, to prevent the retainer from loosening or sliding out, this invention adopts two snap rings placed on the ends of the ball bearing. Each snap ring is made of plastic with evenly distributed radial openings for easy assembling with the sleeve.

BRIEF DESCRIPTION OF THE DRAWING

The drawings disclose an illustrative embodiment of the present invention which serves to exemplify the various advantages and objects hereof, as follows:

FIG. 4A shows a cross-sectional view of a single ball track of the steel ball retainer of the present invention;

FIG. 4B shows the steel balls' circulation in the ball track of the present invention;

DETAILED DESCRIPTION OF THE PREFERRED EMBODIMENT

Figure 1:
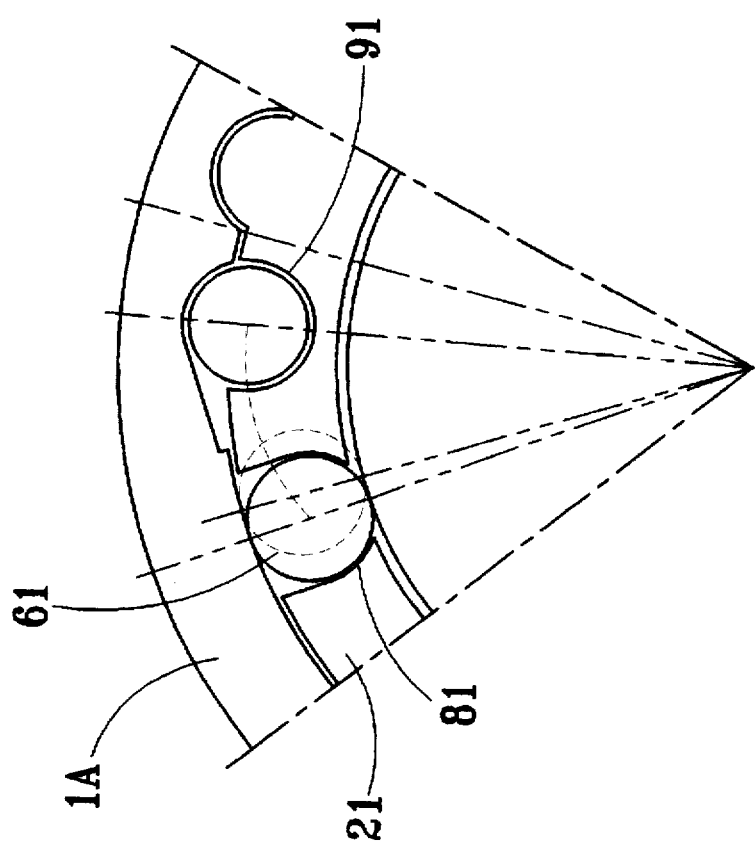
FIG. 1 shows the ball turning region of the traditional linear steel ball bearing's outer sleeve and ball retainer.

FIGS. 2–7 illustrate the present invention, a linear ball bearing. The linear ball bearing comprises an outer sleeve 1, a ball retainer 2, and a six ball tracks 69 evenly distributed on the outer surface of the ball retainer 2. Snap rings 3 secure both ends of the ball retainer 2. The outer sleeve 1 has a smooth outer surface and a unique inner surface profile including several evenly distributed square indents 4, and grooves to accommodate the projecting balls 6 while they are in the unloaded ball grooves 5. The exterior of the ball retainer 2 includes a plurality of evenly distributed ball tracks and square projections 7. Each ball track comprises a linear loaded ball groove 8, a linear unloaded ball groove 9, and two semi-circular ball turning grooves 10 which allow the steel balls to turn 180 degrees between the two linear ball grooves.

Figure 2:
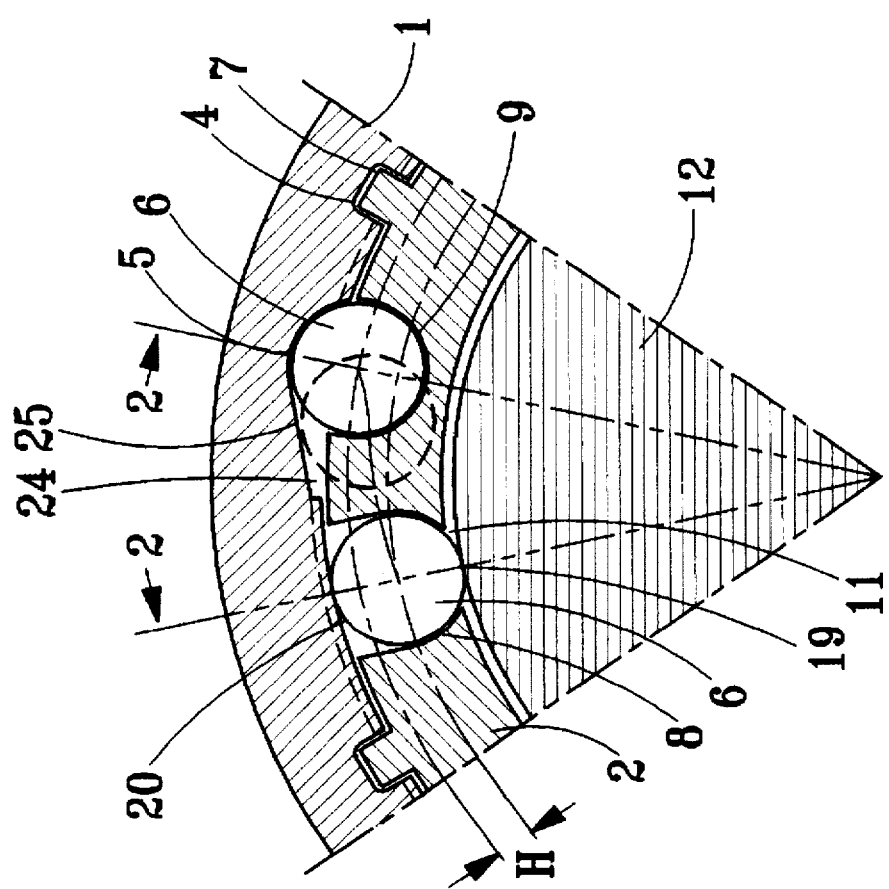
FIG. 2 shows a cross-sectional view of the present invention.
Figure 3:
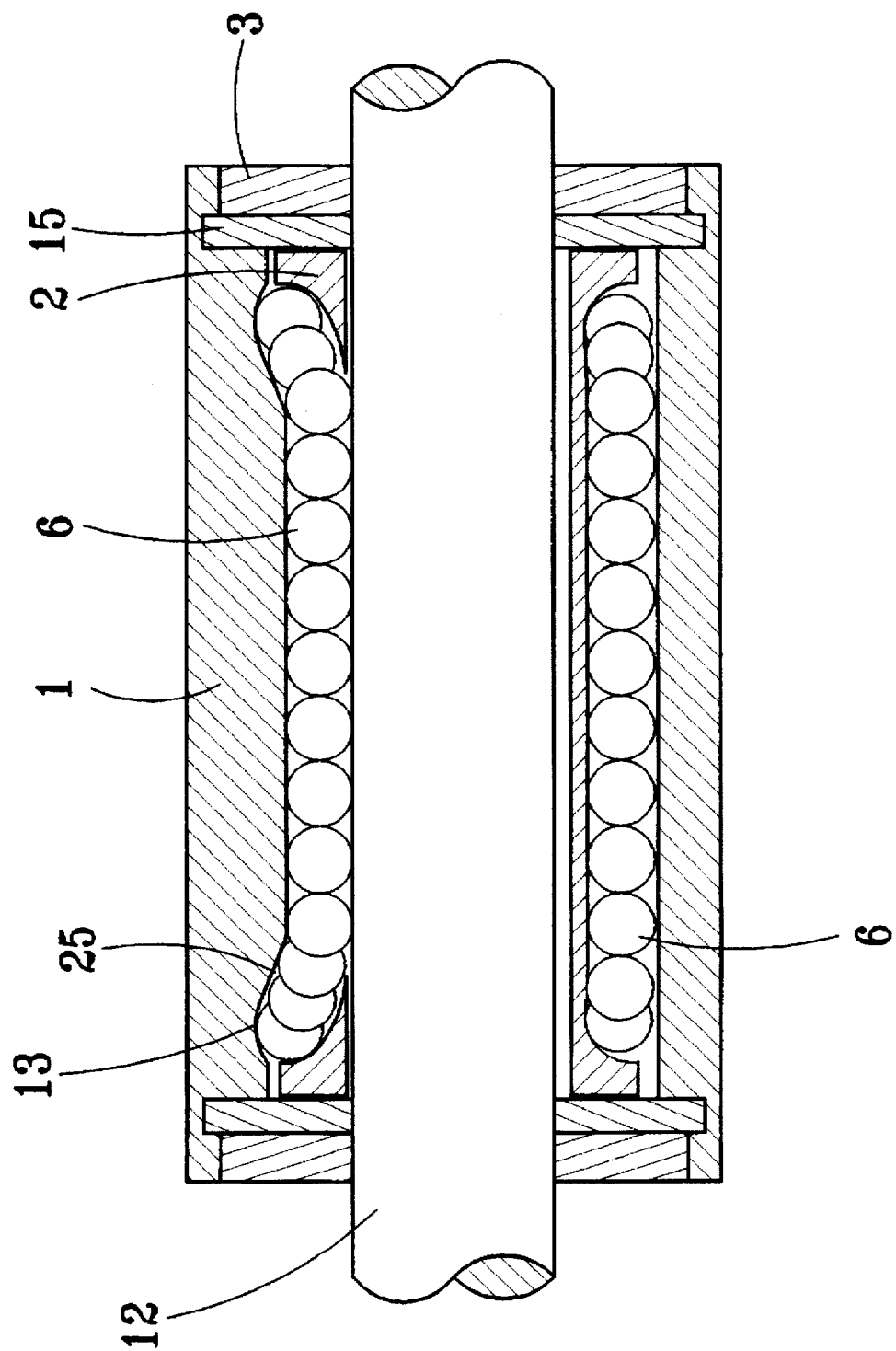
FIG. 3 shows a cross-sectional view along line 2—2 in FIG. 2.
Figure 6:
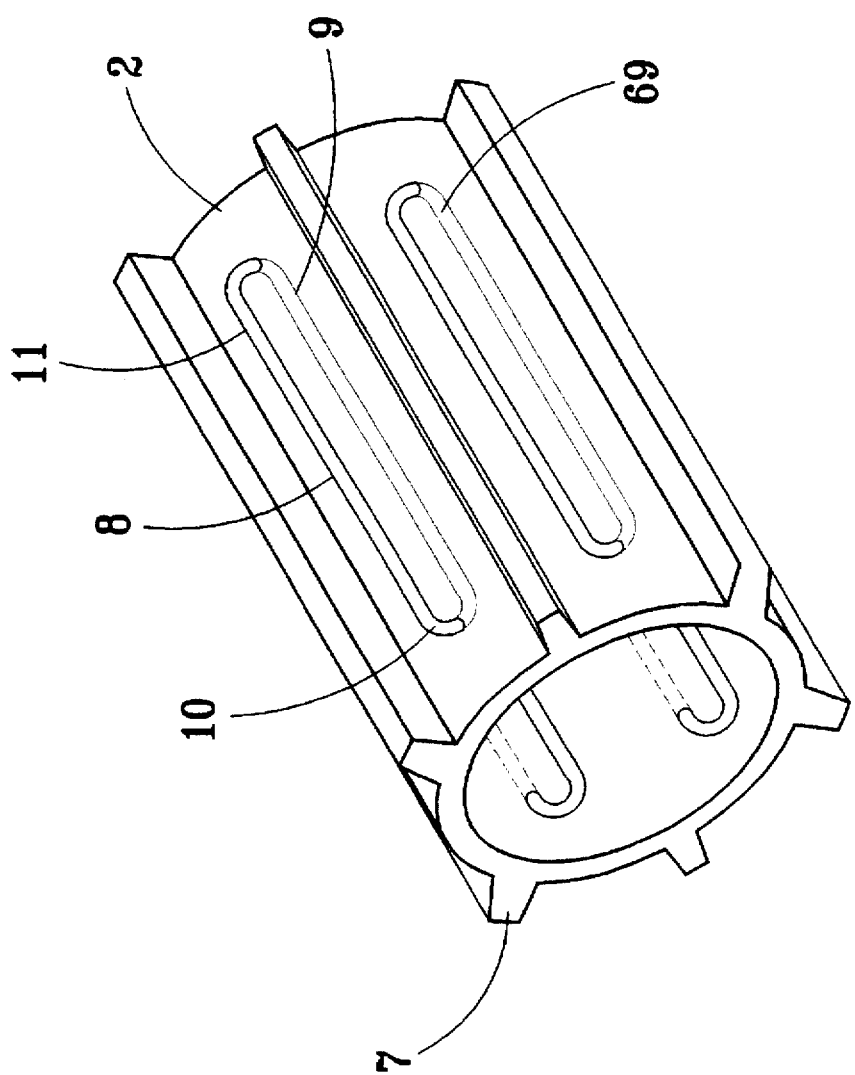
FIG. 6 shows the ball retainer of the present invention.

The ball retainer 2 is placed in outer sleeve 1. The square projections 7 of the ball retainer 2 align with the indents 4 on the outer sleeve 1 to prevent the ball retainer 2 from rotating within the outer sleeve 1 because such rotation would hinder the circulation of the steel balls. As shown in FIG. 2, the ball retainer 2 is designed so that each ball track's unloaded ball groove 9 and each loaded ball groove 8 are next to each other on the retainer. The square projections 7 are placed between one ball track's unloaded ball groove 9 and another track's loaded ball groove 8. The square projections 7 (as shown in FIG. 6) protrude outward from the ball retainer 2. The loaded ball groove 8 has an opening 11. When the linear ball bearing is sleeved on a shaft 12, loaded ball 6 will contact the outer surface 19 of the shaft 12 through the opening 11. The opposite side of the loaded ball 6 contacts an inner surface 20 of outer sleeve 1 to carry the external load. The steel balls 6 can move continuously along the tracks on the ball retainer 2.

The unloaded ball groove 9 has a semi-circular cross section, and its depth is less than that of the loaded ball grooves 8 such that the steel balls 6 in the unloaded ball groove 9 will protrude beyond the outer surface of the ball retainer 2. Therefore, the inner surface of the outer sleeve 1 is formed with ball grooves 5 to accommodate the protruding steel balls 6, providing clearance between the steel balls 6 and the outer sleeve 1 to allow the steel balls to circulate. The balls' circulation tracks each comprise a linear loaded ball groove 8, a linear unloaded ball groove 9, and two semi-circular ball turning grooves 10. The purpose of the ball turning grooves 10 is to form a continuous loop by connecting the loaded 8 and the unloaded 9 ball grooves at both ends. The depth of the ball turning groove 10 is varied through two stages.

Figure 5:
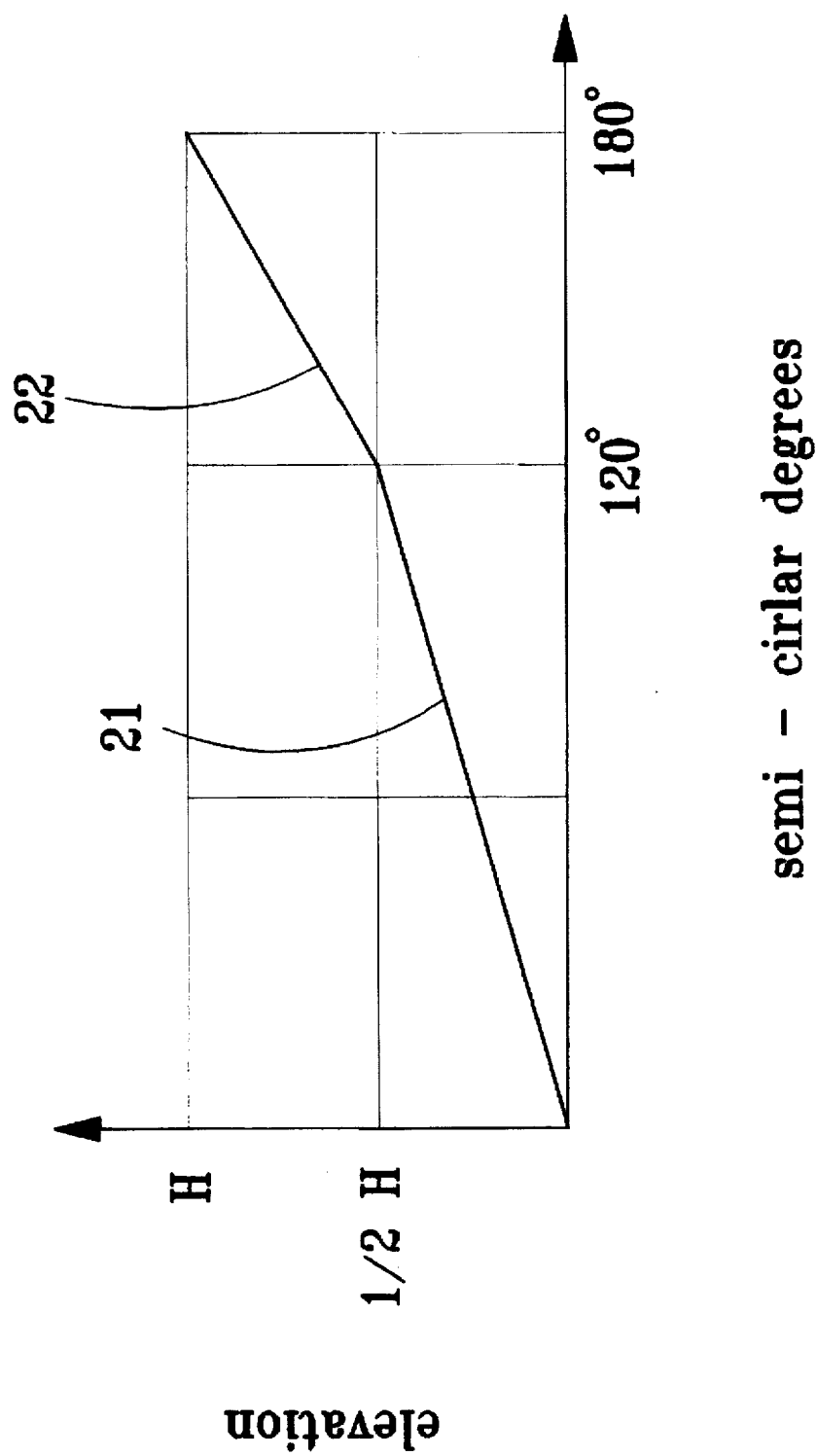
FIG. 5 shows the elevation variation in the ball turning groove.

At a first stage 21, the depth of the ball groove is gradually decreased to ½H. The depth variation region 21 is from the junction of the loaded ball groove 8 and the ball turning groove 10 through an arc of about 120 degrees. The symbol H (as shown in FIG. 5) represents the difference of the height from the loaded groove's level to the unloaded groove's level. The ball turning groove 10 within this region has a radial opening 11, and the steel balls 6 are kept inside the turning groove. As shown in FIG. 4A and FIG. 4B, the steel balls 6 are moved from the steel ball 61 position to the steel ball 64 position, passing through the steel balls 62 and 63 positions. An indented surface 25 of the outer sleeve 1 is simply cut by a lathe to accommodate the protruding balls. In region 21, the steel balls 6 leave the shaft surface 19 and can easily pass between the loaded groove 9 and the turning groove 10.

A second stage depth variation 22 is from the about 120 degrees' position of the ball turning groove 10 to the junction of the ball turning groove 10 and the unloaded ball groove 9. The depth of the ball turning groove at this region is gradually decreased to the unloaded groove's level. In addition, the opening 11 is shrunk and eventually closed. At this stage, the ball protrudes beyond the surface of the steel ball retainer 2. Therefore, a slanted groove 13 (shown in FIG. 3), whose height is not less than the ball's change in position due to the depth variation, is machined on the outer sleeve's surface at a position corresponding to the ball turning groove 10. As shown in FIG. 4A and FIG. 4B, the steel balls 6 are moved from the steel ball 65 position to the steel ball 66 position. The slanted groove 13 allows the turning of the steel balls to not be disturbed in the ball turning groove 10. Such disturbance is caused when balls contact the inner surface of the outer sleeve 1 and retainer 2 at the same time.

In the present invention, the newly designed depth variations of the semicircular ball turning groove 10 will also make the steel balls' assembly into retainer 2 much easier because during assembly, the loaded ball groove 8 and the matched inner surface of the outer sleeve 1 do not interfere.

In addition, ball grooves 5 on the inner surface of the outer sleeve 1 are machined to avoid any contact between the inner surface of outer sleeve 1 and the steel balls 6 when the steel balls in the ball turning groove 10 change their linear motion to a turning motion.

Moreover, the depth variations of the ball turning groove 10 will make the gap 24 between the outer sleeve 1 and the ball retainer 2 smaller. Thus, this new design decreases the possibility of any contamination slipping into the ball's circulating path. Therefore, the service life of the linear ball bearing will be prolonged. Also, the simplified geometric shape of the inner surface of the outer sleeve 1 can be easily machined and thus reduce the production cost.

Figure 7:
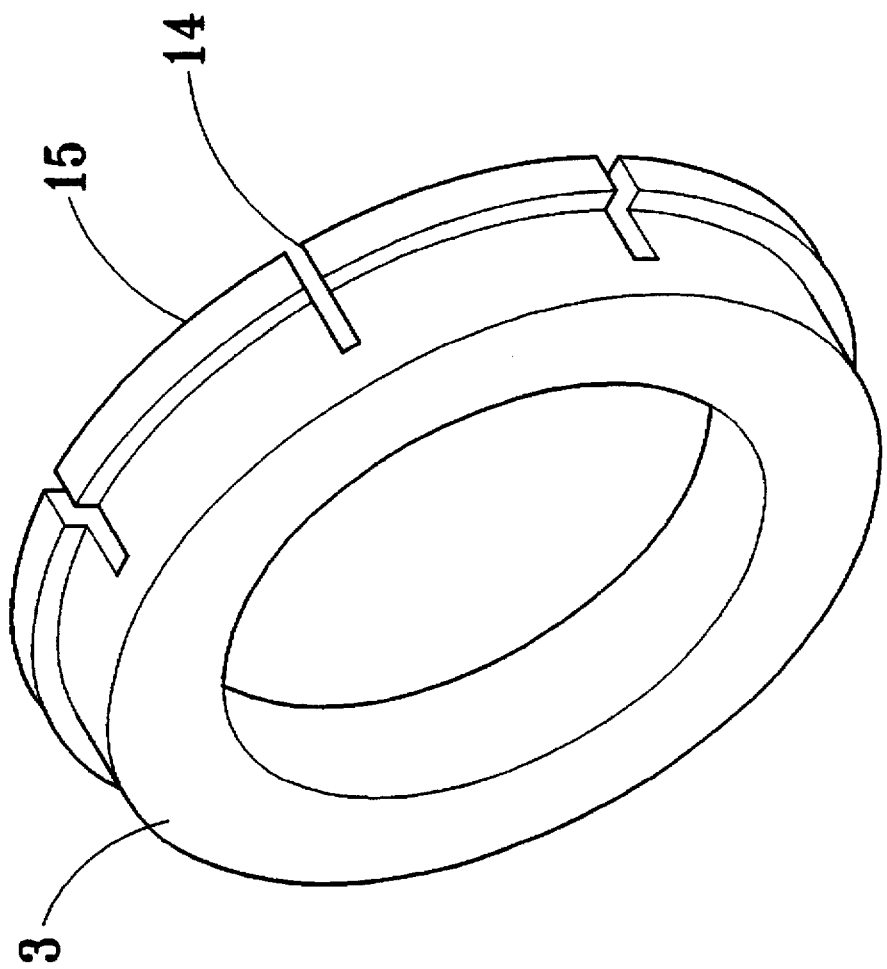
FIG. 7 shows the snap ring of the present invention.

Each end of the outer sleeve 1 for the present invention has been equipped with one snap ring 3 (as shown in FIG. 7). The snap ring 3 is made of plastic and has a flange channel 15 on its circumference. There are several radial openings 14 on the outer circumference of the snap ring as well as on the flange's surface. The snap ring can be locked into a groove on the end of the outer sleeve to prevent the separation of the ball retainer 2 and the outer sleeve 1.

Many changes and modifications to the invention described above can be, of course, carried out without departing from the scope thereof. Accordingly, the invention is intended to be limited only by the scope of the appended claims.

What is claimed is:

1. A linear ball bearing comprising:

an outer sleeve, a ball retainer, and a plurality of ball tracks, each of said ball tracks comprises a linear loaded ball groove, a linear unloaded ball groove, and two ball turning grooves which connect said linear loaded ball groove and said linear unloaded ball groove to form a continuous circuit, each of said turning grooves includes a first and a second stage, in said first stage steel balls of said linear ball bearing move from said loaded ball groove through an approximately 120 degree turn, in said first stage a depth of said turning groove is gradually decreased, said depth being decreased in said first stage an amount equal to one-half the difference in elevation of said loaded ball groove and said unloaded ball groove, and in said second stage said depth of said ball groove is further decreased until it coincides with said unloaded ball groove, at which point said steel balls protrude beyond an outer surface of said ball retainer, a small indentation on an inner surface of said outer sleeve accommodating said protrusion of said steel balls.

2. The linear ball bearing as claimed in claim 1, wherein:

snap rings are locked into grooves on each end of said outer sleeve to prevent separation between said ball retainer and said the outer sleeve, said snap rings include multiple radial openings to allow said snap rings to be easily locked into said grooves.

* * * * *